United States Patent Office 3,689,274
Patented Sept. 5, 1972

---

3,689,274
PROCESS OF HARDENING PHOTOGRAPHIC GELATIN LAYERS WITH A SULFONYL ESTER OR A SULFONAMIDE
Johannes Sobel, Leverkusen, Wolfgang Himmelmann, Cologne-Stammheim, and Heinz Meckl, Cologne-Flittard, Germany, assignors to Agfa-Gevaert Aktiengesellschaft, Leverkusen, Germany
No Drawing. Continuation of abandoned application Ser. No. 795,080, Jan. 29, 1969. This application Aug. 6, 1971, Ser. No. 169,818
Claims priority, application Germany, Feb. 16, 1968, P 16 22 260.9
Int. Cl. G03c 1/30
U.S. Cl. 96—111                    1 Claim

ABSTRACT OF THE DISCLOSURE

A process of hardening the gelatin of a photographic layer by the addition of a sulfonyl ester or a sulfonamide to the casein solution.

---

This application is a streamlined continuation of application Ser. No. 795,080 filed Jan. 29, 1969, now abandoned.

The invention relates to the hardening of gelatin-containing photographic layers by incorporating therein vinyl sulfonic acid derivatives.

BACKGROUND OF THE INVENTION

Many cross-linking or hardening agents for gelatin have already been described. Thus, for example, metal salts such as chromium, aluminium or zirconium salts, aldehydes or their derivatives, especially formaldehyde, dialdehydes, mucochloric acid, diketones, quinones and chlorides of dibasic organic acids and dianhydrides have been found useful for the treatment of gelatin. Compounds which contain at least two easily cleavable three-membered heterocyclic rings, e.g. ethylene oxide or ethylene imine rings, can be used as hardeners for gelatin. Polyfunctional methanesulfonic acid esters and bis-α-chloroacylamido compounds have also been described as hardeners for gelatin.

High molecular weight hardeners such as polyacrolein and its derivatives or copolymers and alginic acid derivatives, have been described as hardeners which are fast to diffusion.

These hardeners, however, have in many instances exhibited unwanted photographic effects of one kind or another. For instance hardeners of the aldehyde type sometimes show a tendency to cause an increase in fogging of the emulsion. Other types of hardeners have a tendency to cause loss of speed of the emulsion upon storage. Others deleteriously effect the physical properties of the gelatin layers, e.g. the fragility. Others tend to discolor or give rise to changes in the pH during the hardening reaction. It is particularly important that the hardening of photographic layers should reach its maximum as soon as possible after drying so that the permeability to the developer solution will not constantly vary, as, e.g., when mucochloric acid or formaldehyde are used.

In some cases, e.g. the ethylene imine compounds, or the trichlorotriazine and dichloroaminotriazines the hardeners for the gelatin are also harmful to the skin and they cannot be used for physiological reasons.

Water-soluble derivatives of chloro triazines which contain carboxyl and sulfonic acid groups and which are obtained, for instance, by reacting cyanuric chloride with 1 mol of diaminoalkylsulfonic acid or diaminoarylsulfonic acid or carboxylic acid do not have these disadvantages and have recently been proposed for use as hardeners. They are, however, of limited utility because owing to their high solubility they decompose when left to stand in aqueous solutions and therefore rapidly lose their activity.

Compounds which have two or more acrylic acid amide groups or vinyl sulfone groups in the molecule, e.g. divinyl sulfone, arylene bis-vinylsulfones and N,N',N''-trisacryloylhydrotriazine or methylene-bis-sulfonamide are also known as hardeners for photographic gelatin layers. However, these compounds do not harden sufficiently rapidly, i.e. the maximum hardening is achieved only some months after casting of the layers. This effect is very undesirable since important photographic properties such as the gradation and sensitivity and also in many cases the silver covering power depend on the degree of hardener and hence these change in storage. Although this disadvantage can be minimized by a brief after-treatment of the solidified layer with ammonia or with an amine, it cannot be completely overcome. Another disadvantage of aliphatic divinyl sulfones is their harmful effect on the skin.

It is among the objects of the instant invention to provide hardeners for photographic gelatin layers which exhibit no known detrimental photographic effect, which have as low a vapour pressure as possible and which will produce the final hardening of the layers as quickly as possible.

SUMMARY OF THE INVENTION

We now have found that vinyl sulfonic acid derivatives of difunctional or polyfunctional phenols, which may be substituted, or of hydrogenated diazines or triazines, which may be substituted, such as piperazine, or hexahydro-1,3,5-triazine are very suitable for use as hardeners for photographic gelatin-containing layers.

DETAILED DESCRIPTION

The hardeners of the present invention include those of the formula:

$$X(SO_2.CH=CH_2)_n$$

in which represent:

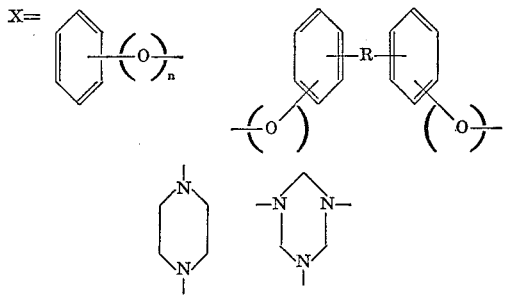

R=either (1) a direct chemical bond, e.g. as in the case of diphenyl compounds or (2) an alkylene group having having up to 4 carbon atoms or (3) a sulfonyl group; $n=2$ or 3.

The phenyl groups in this formula may contain further substituents such as halogen, e.g. chlorine or bromine, and short-chain alkyl groups having 1 to 4 carbon atoms. The same applies to the diazine or triazine rings, which may be substituted, e.g. with alkyl groups having up to 3 carbon atoms.

The following compounds are given as examples of such compounds:

1. 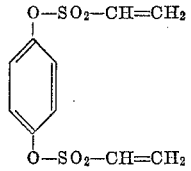

2. 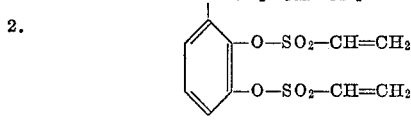

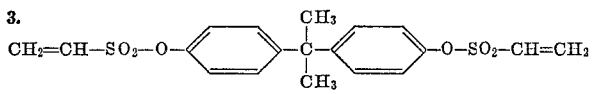

3. 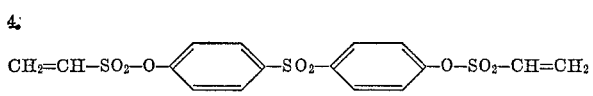

4. 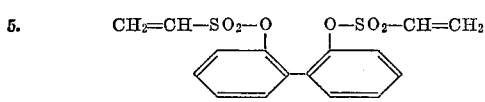

5. 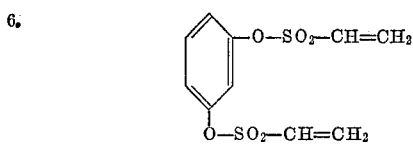

6. 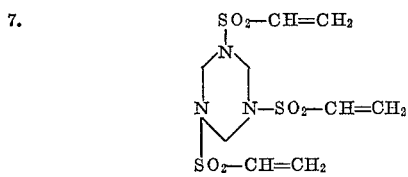

7. 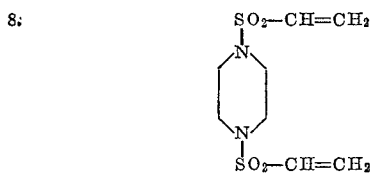

8. 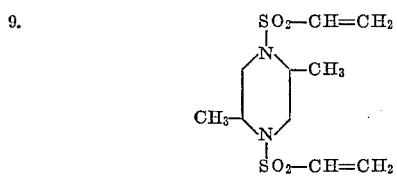

9.

$$\underset{CH_3-\underset{SO_2-CH=CH_2}{\overset{N}{\bigg|}}}{\overset{SO_2-CH=CH_2}{\underset{N}{\bigg|}}-CH_3}$$

The preparation of such compounds has been described, e.g. in German Auslegeschrift 1,094,735 and 1,178,071 and in British Pat. No. 1,071,298.

The hardeners of the present invention are generally soluble in acetone, methanol or in mixtures of water and organic solvents, and are preferably added before casting to the gelatin layers which are to be hardened. Photographic layers in this context are to be understood to mean quite generally layers which are used for photographic materials, e.g. light-sensitive silver halide emulsion layers, protective layers, filger layers, antihalo layers, backing layers or photographic auxiliary layers in general. The effect of the hardener of the present invention is not impaired by the usual photographic additives. They are inert to photographically active substances such as color components, stabilizers, sensitizers and the like. Furthermore, they have no influence on the photographic properties of the light-sensitive silver halide emulsions.

The concentration of the hardeners according to the invention may vary within wide limits. It depends to a large extent on the type of the layer to be hardened on the effects desired. In general amounts of between 1 and 5% by weight based on the dry weight of gelatin have proved sufficient.

The hardening reaction with gelatin does not take place immediately but only on drying of the layer, simply by allowing it to stand or preferably by exposing it to elevated temperatures of about 40 to 120° C.

The melting point of the layers is determined as follows: The layer which has been cast on a support is half dipped in water which is maintained at 100° C. The temperature at which the layer runs off the support, with the formation of smears, is taken as the melting point or melting off point. The melting points of the layers which had been hardened according to the invention were determined in other tests after a 5 minutes' treatment with a 5% aqueous soda solution, immediately after drying and after the storage time given above. In all these tests, it was found that the effectiveness of the hardeners according to the invention was not impaired. Under the measuring conditions, pure gelatin layers without hardener in no case showed an increase in melting point.

Example 1

100 ml. of a 10% gelatin solution are adjusted to pH 6.2, and each of the following solutions of hardener according to the invention were added. The resulting mixture is in each case applied onto a support of triacetyl cellulose which is covered with a layer of adhesive. A clear gelatin layer of the type used as a backing layer or protective layer in photographic materials is obtained. Determination of the melting points is carried out after 36 hours' storage at 56° C. and 40% relative humidity and after 12 hours' storage at room temperature in each case. 1, 2 and 0.5% (based on the dry weight of gelatin) of hardener, respectively, are added to the gelatin solution. The melting points are given in the following table:

| | Melting points of the layer in ° C. | | | | | |
|---|---|---|---|---|---|---|
| | Stored 12 hours at 22° C. | | | Stored 36 hours at 56° C. and 34% relative humidity | | |
| Quantity, percent | 0.5 | 1 | 2 | 0.5 | 1 | 2 |
| Compound: | | | | | | |
| 6 | 40 | 86 | | 50 | 100 | |
| 2 | 45 | 60 | | 81 | 100 | |
| 5 | | 50 | 62 | | 61 | 100 |
| 7 | | 92 | 100 | | 100 | 100 |

In all these tests, it is found that the activity of the hardeners according to the invention is very high.

Example 2

32 ml. of a 5% solution of compound 5 in acetone are slowly added to 1 liter of a silver chlorobromide gelatin emulsion which contains 80 g. of gelatin, which amounts to an addition of 2% based on the dry weight of gelatin, and the pH is adjusted to 6.2. The solution is cast on a support of a polyester based on polyethylene terephthalate, which support is covered with a subbing layer, and dried at room temperature. The melting points of the layer were as follows:

(1) after a storage time of 12 hours at room temperature: 50° C.;
(2) after a storage time of 36 hours at 56° C. and 34% relative humidity: over 100° C.;
(3) after processing following (2), i.e. after the use of a developer bath, a fixing bath and washing: over 100° C.

The photographic properties of the layer remained unchanged. Fogging did not occur.

The susceptibility to damage of the wet layer is greatly reduced compared to that of an unhardened layer and the vertical swelling drops to 350% (the corresponding unhardened layer swells by about 600 to 700%). Swelling was determined after 10 minutes washing at 20° C. by a method which is described in the publication in AGFA-Mitteilungen, Leverkusen-Munich, volume III, p. 215 (published by Springer Verlag, Berlin, Gottingen, Heidelberg 1961).

Example 3

120 ml. of an 8% aqueous solution of the alkali metal salt of a cyan color coupler of the following formula:

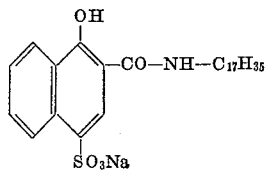

are added to 400 ml. of a silver chlorobromide gelatin emulsion which contains 32 g. of gelatin.

After addition of 30 ml. of a 5% aqueous solution of saponin and 5 ml. of a 1% methanolic solution of 1,3,3a,7-tetraaza-4-hydroxy-6-methylindene, 250 ml. of a water are added, the pH is adjusted to 6.2 and 32 ml. of a 1% solution in acetone of compound 7 are added to the solution obtained. The finished casting solution is applied onto a support of acetyl cellulose. The viscosity of the casting solution does not vary over a period of 6 hours.

The layers are dried at room temperature. The melting points of the resulting layer are as follows:

(1) after 36 hours' storage at room temperature: 40° C.;
(2) after a storage time of 36 hours at 56° C. at 40% relative humidity: >100° C.;
(3) after processing following (2), with a colored development bath, a fixing bath, the bleaching bath and final rinsing: >100° C.

The photographic properties of the layer remain unchanged. After the color-forming processing, a cyan dye image is obtained. The wet layer has a high scratch resistance and is firmly bonded to the surface.

Example 4

The rates of hardening of N,N',N''-tris-acrylohydrotriazine (TAHT) and compound 7 can be compared as follows:

2 liters of a silver chlorobromide gelatin emulsion which contains 160 g. of gelatin and 32 g. of the alkali metal salt of the cyan coupler of Example 3 are adjusted to pH 6.2, 2.4 g. of compound 7 and 1.6 g. of triacrylohydrotriazine dissolved in acetone are each added to separate 1 liter portions of the casting solution. After casting on a baryta-coated paper support and the usual drying, the melting points of the layers are determined.

| Quantity | Melting point in ° C. after— | | |
|---|---|---|---|
| | Casting | 4 weeks' storage at 22° C. | 3 days' storage in a heating chamber at 60° C./40% relative humidity |
| 2.4 g. Compound 7. | 100/7 min.+ | 100/15 min. | 100/15 min. |
| 1.6 g. TAHT | 36 | 50 | 100/15 min. |

After the temperature, the time of boiling in minutes after which the layer becomes detached from the support is given.

Final hardening is obtained by storage in a heating chamber.

It will be seen that the maximum hardening is achieved after about 2 to 3 weeks in the case of compound 7. The hardener used for comparison reacts much more slowly.

In both cases, the photographic properties remained unchanged.

What is claimed is:

1. A process for hardening photographic gelatin layers comprising the addition of a hardener to the casting solution of the layer which is to be hardened, application on a support and drying of the layer, wherein the hardening agent is selected from the group consisting of N,N',N''-tris-vinylsulfonyl-hexahydro-1,3,5-triazine and alkyl substituted derivatives having up to 4 carbon atoms and bis-vinylsulfonyl hydropyrimidine and derivatives alkyl substituted up to 4 carbon atoms.

References Cited

UNITED STATES PATENTS

| | | | |
|---|---|---|---|
| 2,994,611 | 8/1961 | Heyna et al. | 96—111 |
| 3,132,945 | 5/1964 | Ryan | 96—111 X |
| 3,255,000 | 6/1966 | Gates et al. | 96—111 |

FOREIGN PATENTS

| | | |
|---|---|---|
| 1,094,735 | 7/1959 | Germany. |
| 1,178,071 | 5/1965 | Germany. |
| 1,071,298 | 6/1967 | Great Britain. |

NORMAN G. TORCHIN, Primary Examiner

W. H. LOUIE, JR., Assistant Examiner

U.S. Cl. X.R.

117—34

UNITED STATES PATENT AND TRADEMARK OFFICE
CERTIFICATE OF CORRECTION

PATENT NO. : 3,689,274
DATED : September 5, 1972
INVENTOR(S) : Johannes Sobel et al It is certified that error appears in the above-identified patent and that said Letters Patent is hereby corrected as shown below:

Column 2, line 55, delete "having".

Column 6, line 15, before "After" insert the symbol -- + -- and line 15 should read: + After the temperature, the time of boiling in minutes.

Signed and Sealed this

Twenty-eighth Day of December 1982

[SEAL]

Attest:

GERALD J. MOSSINGHOFF

Attesting Officer

Commissioner of Patents and Trademarks